(12) United States Patent
Tanglertsampan et al.

(10) Patent No.: US 11,436,521 B2
(45) Date of Patent: Sep. 6, 2022

(54) SYSTEMS AND METHODS FOR PROVIDING CONTEXTUAL RECOMMENDATIONS FOR PAGES BASED ON USER INTENT

(71) Applicant: META PLATFORMS, INC., Menlo Park, CA (US)

(72) Inventors: Apaorn Tanglertsampan, Seattle, WA (US); Hannah Marie Hemmaplardh, Seattle, WA (US); Deepak Chinavle, Kirkland, WA (US); Nigel Carter, Redmond, WA (US); Brendon Elias Manwaring, Fairfield, CT (US); Bradley Ray Green, Snohomish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 1001 days.

(21) Appl. No.: 15/666,461

(22) Filed: Aug. 1, 2017

(65) Prior Publication Data
US 2019/0042976 A1  Feb. 7, 2019

(51) Int. Cl.
*G06N 20/00* (2019.01)
*G06N 5/02* (2006.01)
*G06Q 50/00* (2012.01)
*G06Q 30/02* (2012.01)

(52) U.S. Cl.
CPC .............. *G06N 20/00* (2019.01); *G06N 5/022* (2013.01); *G06Q 30/0201* (2013.01); *G06Q 50/01* (2013.01)

(58) Field of Classification Search
CPC ........ G06N 20/00; G06N 5/022; G06Q 50/01; H04L 51/32; H04L 51/26; H04L 12/58
See application file for complete search history.

(56) References Cited

U.S. PATENT DOCUMENTS

| | | | | |
|---|---|---|---|---|
| 9,582,154 B2* | 2/2017 | Greenberg | .......... | G06F 3/04842 |
| 9,798,832 B1* | 10/2017 | Lessin | ................. | G06F 16/9038 |
| 9,965,559 B2* | 5/2018 | Marcin | ................. | G06F 40/295 |
| 10,073,589 B1* | 9/2018 | Jesensky | ............... | G06F 3/0485 |
| 2010/0114544 A1* | 5/2010 | Dogru | ..................... | E21B 49/00 |
| | | | | 703/10 |
| 2015/0178283 A1* | 6/2015 | Garg | ..................... | G06F 16/248 |
| | | | | 707/748 |

(Continued)

OTHER PUBLICATIONS

Hong, Liangjie et al., "Learning to rank social update streams", Aug. 2012, SIGIR '12: Proceedings of the 35th international ACM SIGIR conference on Research and development in information retrieval (Year: 2012).*

(Continued)

*Primary Examiner* — Daniel T Pellett
(74) *Attorney, Agent, or Firm* — Sheppard Mullin Richter & Hampton LLP

(57) ABSTRACT

Systems, methods, and non-transitory computer readable media can determine one or more actions that a user is likely to take on a page associated with a social networking system, based on one or more first machine learning models. One or more card types that correspond to the one or more actions can be ranked based on a second machine learning model. One or more cards can be generated based on the ranked card types, and each card can include a recommended action associated with the page.

20 Claims, 11 Drawing Sheets

(56) References Cited

U.S. PATENT DOCUMENTS

| | | | |
|---|---|---|---|
| 2016/0055160 A1* | 2/2016 | Himel | G06F 16/248 |
| | | | 707/728 |
| 2016/0103563 A1* | 4/2016 | Greenberg | G06F 3/04842 |
| | | | 715/738 |
| 2016/0103791 A1* | 4/2016 | Greenberg | G06Q 30/0635 |
| | | | 715/202 |
| 2017/0228349 A1* | 8/2017 | Yang | H04L 51/16 |
| 2018/0089195 A1* | 3/2018 | Nevarez | G06F 16/248 |
| 2018/0253496 A1* | 9/2018 | Natchu | G06F 16/951 |

OTHER PUBLICATIONS

Agarwal, Deepak et al., "Activity Ranking in LinkedIn Feed", Aug. 2014, KDD '14: Proceedings of the 20th ACM SIGKDD international conference on Knowledge discovery and data mining (Year: 2014).*

Chen, Bee-Chung et al., "Personalizing LinkedIn Feed", Aug. 2015, KDD '15: Proceedings of the 21 th ACM SIGKDD International Conference on Knowledge Discovery and Data Mining (Year: 2015).*

Zhang, Yinan, and Chengxiang Zhai. "A sequential decision formulation of the interface card model for interactive IR." Proceedings of the 39th International ACM SIGIR conference on Research and Development in Information Retrieval. 2016. (Year: 2016).*

* cited by examiner

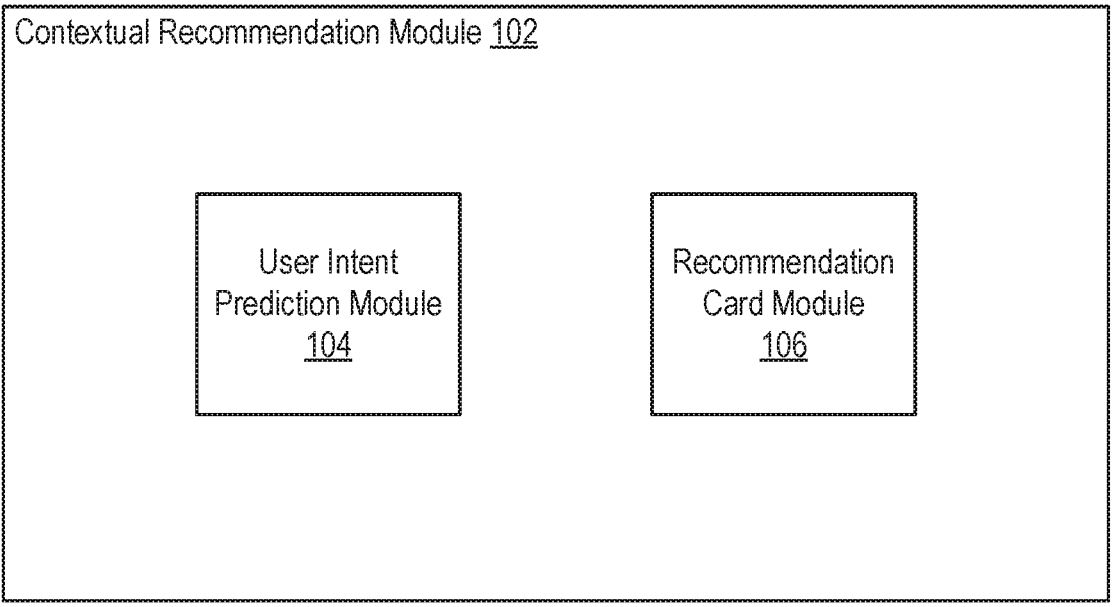
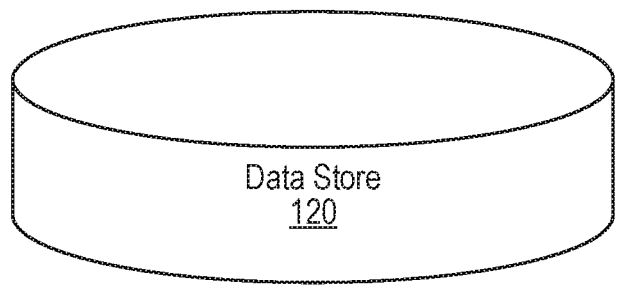
FIGURE 1

Determine one or more actions that a user is likely to take on a page associated with a social networking system, based on one or more first machine learning models
402

Rank one or more card types that correspond to the one or more actions, based on a second machine learning model
404

Generate one or more cards based on the ranked card types, each card including a recommended action associated with the page
406

Train one or more first machine learning models to predict a likelihood of users taking particular actions on pages
502

Train a second machine learning model to predict a likelihood of users engaging with cards of particular card types
504

SYSTEMS AND METHODS FOR PROVIDING CONTEXTUAL RECOMMENDATIONS FOR PAGES BASED ON USER INTENT

FIELD OF THE INVENTION

The present technology relates to the field of social networks. More particularly, the present technology relates to techniques for providing recommendations for pages associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

The social networking system may provide pages for various entities. For example, pages may be associated with companies, businesses, brands, products, artists, public figures, entertainment, individuals, and other types of entities. Pages can be dedicated locations provided by the social networking system to reflect the presence of the entities on the social networking system.

SUMMARY

Various embodiments of the present disclosure can include systems, methods, and non-transitory computer readable media configured to determine one or more actions that a user is likely to take on a page associated with a social networking system, based on one or more first machine learning models. One or more card types that correspond to the one or more actions can be ranked based on a second machine learning model. One or more cards can be generated based on the ranked card types, and each card can include a recommended action associated with the page.

In some embodiments, the one or more cards can be provided for display to the user on the page.

In certain embodiments, the one or more cards can be provided for display to the user in a feed of the user.

In an embodiment, the one or more first machine learning models are trained to predict a likelihood of users taking particular actions on pages.

In some embodiments, the second machine learning model is trained to predict a likelihood of users engaging with cards of particular card types.

In certain embodiments, a card includes a header, content, a footer, personalized data, and a button associated with a recommended action.

In an embodiment, the content includes one or more of: an image, a video, text, a link, a map, a preview, a review, or a portion of a review.

In some embodiments, the one or more first machine learning models are trained based on features including one or more of: user attributes, page attributes, attributes associated with interactions between users and pages, or attributes associated with interactions between users and page categories.

In certain embodiments, the second machine learning model is trained based on features including one or more of: scores indicative of a likelihood of users taking particular actions on pages, click through rates for cards, click through rates for card types, user attributes, page attributes, attributes associated with interactions between users and pages, or attributes associated with interactions between users and page categories.

In an embodiment, the one or more actions that are determined for the user are indicative of an intent of the user for visiting the page.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example contextual recommendation module configured to provide contextual recommendations for pages, according to an embodiment of the present disclosure.

FIG. 3A illustrates an example user interface for providing contextual recommendations for pages, according to an embodiment of the present disclosure.

FIG. 4 illustrates an example first method for providing contextual recommendations for pages, according to an embodiment of the present disclosure.

Figure 2:
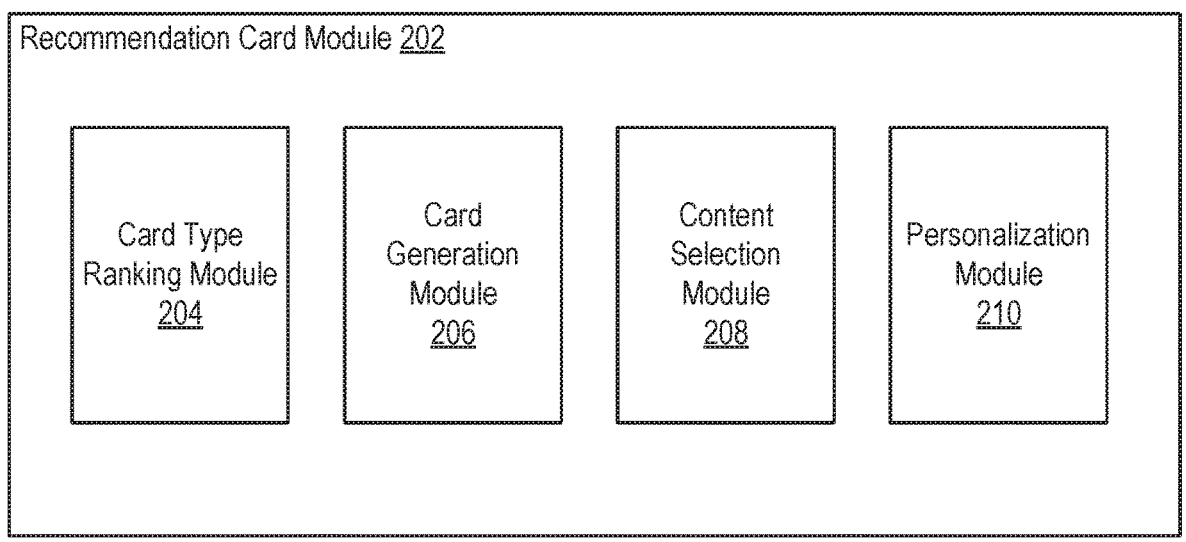
FIG. 2 illustrates an example recommendation card module configured to generate cards for recommended actions for pages, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Contextual Recommendations for Pages Based on User Intent

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed of a user.

The social networking system may provide pages for various entities. For example, pages may be associated with companies, businesses, brands, products, artists, public figures, entertainment, individuals, and other types of entities. Pages can be dedicated locations on the social networking system to reflect the presence of the entities on the social networking system. Conventional approaches specifically arising in the realm of computer technology can provide information associated with an entity through a page. For example, the same or similar content can be provided to users who visit the page. However, users may not know where on the page to find relevant or desired information about an associated entity. For example, users may not be aware of various functionalities offered by the page. As another example, users may not know what services or products are offered by the page.

An improved approach rooted in computer technology can overcome the foregoing and other disadvantages associated with conventional approaches specifically arising in the realm of computer technology. Based on computer technology, the disclosed technology can provide contextual recommendations associated with pages to users. In some embodiments, contextual recommendations for a page can be provided as one or more cards on the page. A contextual recommendation for a page can be provided to a user based on the user's likely intent for visiting the page. A user's intent for visiting a page can be represented by one or more actions that can be taken on a page, and a user's intent can be predicted by predicting one or more actions that the user is likely to take on a page. The disclosed technology can determine one or more actions a user is likely to take on a page based on machine learning techniques. Card types that correspond to the determined actions can be ranked based on machine learning techniques. A card can be created for a ranked card type. Content can be determined for a card. A card can also be personalized. In this manner, the disclosed technology can provide recommendations that are relevant to what a user is trying to accomplish on a page and can help the user engage with the page in accordance with the desires of the user. Details relating to the disclosed technology are provided below.

FIG. 1 illustrates an example system 100 including an example contextual recommendation module 102 configured to provide contextual recommendations for pages, according to an embodiment of the present disclosure. The contextual recommendation module 102 can include a user intent prediction module 104 and a recommendation card module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the contextual recommendation module 102 can be implemented in any suitable combinations. While the disclosed technology is described in connection with contextual recommendations for pages associated with a social networking system for illustrative purposes, the disclosed technology can apply to any other type of system and/or content.

The contextual recommendation module 102 can provide a contextual recommendation for a page to a user based on the user's predicted intent for visiting the page. A contextual recommendation can indicate a recommended action that can be taken by a user on a page. A user's intent for visiting a page can be related to or represented by one or more actions that can be taken on a page. In some embodiments, one or more actions a user is likely to take on a page can serve as a proxy for the user's intent for visiting the page. Accordingly, a user's intent can be predicted by predicting one or more actions that the user is likely to take on a page. One or more recommended actions can be provided to a user based on one or more predicted actions for a user. In some embodiments, each recommended action can be referred to as a contextual recommendation. Each recommended action can be represented as a card and displayed to a user for selection.

The user intent prediction module 104 can determine one or more actions that a user is likely to take on a page. The user intent prediction module 104 can rank actions that can be taken for pages. Actions that are candidates for ranking can include some or all of possible actions that can be taken for a page. Examples of actions that can be taken on a page can include "get directions," "save," "message," "call," "like," "shop," "book," "see reviews," etc. Many variations are possible. The user intent prediction module 104 can train a machine learning model for each action to determine whether a user is likely to take the action on a page. A machine learning model for an action can be trained based on training data (e.g., labeled data) that includes information associated with the action, such as pages on which the action has been taken and users who have taken the action. The machine learning model for each action can be trained based on various features. For example, features can be selected from user attributes, page attributes, attributes relating to interactions between users and pages ("user-page interaction attributes"), attributes relating to interactions between users and page categories ("user-page category interaction attributes"), etc. User attributes can include any attributes associated with users. Examples of user attributes can include a location (e.g., a country, state, county, city, etc.), an age, an age range, a gender, an interest, a device, an operating system (OS), etc. Page attributes can include any attributes associated with pages. Examples of page attributes can include a page category, an age of a page, a location of a page, a level of user activity on a page, a number of connections or followers of a page, etc. The page category can indicate a category associated with a page, such as a restaurant, a movie, a public figure, etc. For example, actions for a page can differ based on the page category of the page. User-page interaction attributes can indicate which pages users have interacted with in the past. For example, user-page interaction attributes can indicate actions users have taken on different pages. User-page category interaction attributes can indicate which page categories users have interacted with in the past. For example, user-page category interaction attributes can indicate actions users have taken on different pages belonging to particular page categories. Weights associated with various features used to train the machine learning model for an action can be determined. The user intent prediction module 104 can retrain the machine learning model for an action based on new or updated training data. For example, if information about new pages and/or new users becomes available, the user intent prediction module 104 can train the machine learning model for an action based on the information about new pages and/or new users. In some embodiments, one machine learning model can be used for different actions, and the user intent prediction module 104 can train one machine learning model to predict a likelihood of a user taking the different actions.

The user intent prediction module 104 can apply the trained machine learning models for actions to determine one or more actions a user is likely to take on a page. For example, the trained machine learning model can be applied to feature data relating to the user and the page to obtain the determination. The trained machine learning model for each action can determine a likelihood of a user taking the corresponding action on a page. For example, the trained machine learning model for an action can determine a score indicative of a likelihood of a user taking that action on a page. In some embodiments, a score indicative of a likelihood of a user taking an action on a page can be referred to as an "intent score." Actions that can be taken on a page can be ranked for a user based on respective scores for the actions. One or more actions having a score that satisfies a threshold value can be determined to be actions that a user is likely to take on a page. Recommended actions can be provided to a user based on actions that a user is likely to take on a page. In some embodiments, actions that a user is likely to take on a page can be referred to as "intent actions." All examples herein are provided for illustrative purposes, and there can be many variations and other possibilities.

The recommendation card module 106 can generate cards for recommended actions for pages. Card types that correspond to actions that a user is likely to take on a page can be ranked. Cards can be created based on ranked card types. Content and personalized data can be determined for cards. Functionality of the recommendation card module 106 is described in more detail herein.

In some embodiments, the contextual recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the contextual recommendation module 102 can be, in part or in whole, implemented as software running on one or more computing devices or systems, such as on a server system or a client computing device. In some instances, the contextual recommendation module 102 can be, in part or in whole, implemented within or configured to operate in conjunction or be integrated with a social networking system (or service), such as a social networking system 630 of FIG. 6. Likewise, in some instances, the contextual recommendation module 102 can be, in part or in whole, implemented within or configured to operate in conjunction or be integrated with a client computing device, such as the user device 610 of FIG. 6. For example, the contextual recommendation module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the contextual recommendation module 102. The data maintained by the data store 120 can include, for example, information relating to contextual recommendations, predicted user intents or actions, recommended actions, card types, card content, card personalization, machine learning models, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the contextual recommendation module 102 can be configured to communicate and/or operate with the data store 120. In some embodiments, the data store 120 can be a data store within a client computing device. In some embodiments, the data store 120 can be a data store of a server system in communication with the client computing device.

FIG. 2 illustrates an example recommendation card module 202 configured to generate cards for recommended actions for pages, according to an embodiment of the present disclosure. In some embodiments, the recommendation card module 106 of FIG. 1 can be implemented with the example recommendation card module 202. As shown in the example of FIG. 2, the example recommendation card module 202 can include a card type ranking module 204, a card generation module 206, a content selection module 208, and a personalization module 210.

The card type ranking module 204 can rank card types that correspond to actions that a user is likely to take for a page. For example, actions that a user is likely to take for the page can be intent actions determined for the user by the user intent prediction module 104, as described above. An action that can be taken on a page can correspond to one or more card types. Each card type can be associated with a recommended action. In some embodiments, an action that can be taken on a page can map to one card type, and a recommended action associated with the card type can be the same as the action. In other embodiments, an action that can be taken on a page can map to more than one card type, and a recommended action associated with a card type can be the same as or relate to the action. In certain embodiments, multiple actions that can be taken on a page can map to a card type, and a recommended action associated with the card type can be the same as or relate to some or all of the multiple actions. The card type ranking module 204 can rank card types that correspond to intent actions for a user. For each ranked card type, a card that includes a recommended action can be created. For each card, content can be selected, and personalization can be performed, as explained below.

Examples of card types can include a map card type, a save card type, a message card type, a call card type, a like card type, a shop card type, a book card type, a review card type, etc. A map card type (or directions card type) can provide a map and/or directions for a location of an entity associated with a page. A save card type can be associated with saving a page to a data store so that the page can be later accessed. A message card type can be associated with sending a message to a page. A call card type can be associated with calling an entity associated with a page. A like card type can be associated with liking a page. A shop card type can be associated with purchasing products or services. A book card type can be associated with booking or scheduling an appointment, an event, etc. A review card type can be associated with reviews for an entity associated with a page.

The card type ranking module 204 can rank card types based on a likelihood of a user engaging with a particular card type or a card of a particular card type. For instance, a card can be displayed through a user interface presented by a computing device of a user. The user can engage with a card of a particular card type by selecting the card, interacting with the card, performing a recommended action provided by the card, etc. A user can select and/or interact with a card, for example, by a click, a touch gesture, etc. A user can perform a recommended action provided by a card by selecting a user interface (UI) element associated with the recommended action, for example, by a click, a touch gesture, etc.

The card type ranking module 204 can rank card types based on likelihood of user engagement using a machine learning model. The machine learning model can be trained based on training data (e.g., labeled data) that includes information associated with card types, such as whether users have engaged with cards of certain card types, whether users have taken recommended actions on cards of certain card types, content included in cards of certain card types, etc. The training data can include various features. For example, features can include or relate to intent scores for actions corresponding to card types and historical click through rates ("CTRs"). Intent scores for actions corresponding to card types can be determined as described above, for example, by the user intent prediction module 104. Historical CTRs can indicate CTRs for cards of particular card types. Features can also be selected from user attributes, page attributes, user-page interaction attributes, user-page category interaction attributes, etc. User attributes, page attributes, user-page interaction attributes, and user-page category interaction attributes can be the same as or similar to user attributes, pages attributes, user-page interaction attributes, and user-page category interaction attributes, as described above. Weights associated with various features used to train the machine learning model can be determined. The card type ranking module 204 can retrain the machine learning model based on new or updated training data. For example, if information about new pages, new users, new card types, and/or new cards becomes available, the card type ranking module 204 can train the machine learning model based on the information about new pages, new users, new card types, and/or new cards. In some embodiments, more than one machine learning model can be used to rank card types, and the card type ranking module 204 can train a machine learning model to predict a likelihood of a user engaging with a card of each card type. In certain embodiments, the same machine learning model(s) can be used by the user intent prediction module 104 and the card type ranking module 204.

The card type ranking module 204 can apply the trained machine learning model to rank card types for a user in connection with a page. For example, feature data relating to the user and the page can be provided to the trained machine learning model to obtain a ranking. The trained machine learning model can determine a likelihood of a user engaging with a card of a particular card type. For example, the trained machine learning model can determine a score indicative of a likelihood of a user engaging with a card of a particular card type. Card types that correspond to actions that a user is likely to take for a page can be ranked based on respective scores for the card types.

The card generation module 206 can generate a card for a ranked card type. After card types are ranked for a user, cards can be created for the ranked card types for display to the user. In some embodiments, cards can be created for all of the ranked card types. In other embodiments, cards can be created for some of the ranked card types. For example, cards can be created only for card types having a score that satisfies a threshold value. As another example, any duplicate card types can be filtered from the ranked card types, and cards can be created only for unique ranked card types. For instance, there may be duplicate card types if multiple actions map to one or more same card types. In some embodiments, the card generation module 206 can create a header, content, and a footer for each card. A card can include a header, content, and a footer. A header can include personalized data, such as data relating to a user's connections in a social networking system. Content can include any type of information or data that relates to a card type. Some examples of content can include an image, a video, text, a link, a map, etc. Content for a card can be determined by the content selection module 208 as described below. Personalized data for a card can be determined by the personalization module 210 as described below. A footer can include a recommended action associated with a card type and information relating to the recommended action. A recommended action can be represented by a UI element (e.g., a button, a link, an image, an icon, etc.). For example, the recommended action can be performed or executed in response to selection of the UI element, for example, by a click, a touch gesture, etc. As another example, one or more operations or workflows associated with the recommended action can be initiated or performed in response to selection of the UI element.

Cards can be displayed to a user in a user interface. As an example, cards can be displayed to a user on a page to which the card relates. For instance, cards can be displayed on a timeline of a page. As another example, cards can be displayed to a user in the user's feed. For instance, cards can be displayed to the user in the user's feed if the user interacts with (e.g., likes) a page that is displayed in the user's feed. Multiple cards can be organized in a contextual recommendation unit, and the unit can be displayed to a user. In some embodiments, the user can scroll (e.g., horizontally or vertically) within the contextual recommendation unit to view different cards included in the contextual recommendation unit.

The content selection module 208 can determine content for a card. Content can be based on a card type of a card. Content can have any format and include various types of information. Examples of content can include an image, a video, text, a link, a map, a preview, a portion or preview of a review, etc. Content for a card can be selected from available content relating to the card type of the card. In some embodiments, content for a card can be determined based on machine learning techniques. For example, a machine learning model can be trained to determine content for a card for a user based on a likelihood of the user engaging with the card. The machine learning model can be trained based on training data including information associated with cards that have been provided to users for pages and content included in the cards. The training data can include various features. For example, features can include user attributes, page attributes, or any other attributes, as described above. Further, features can include content attributes. Content attributes can include any attributes associated with content included in cards. Some examples of content attributes can include a type of media (e.g., an image, a video, an audio, text, etc.), a length of content, a subject matter, one or more objects represented in content, a popularity of content (e.g., many users interacting with content), etc. Features associated with a card can be provided to the trained machine learning model to determine content for the card. In certain embodiments, the same machine learning model(s) can be used by the user intent prediction module 104, the card type ranking module 204, and the content selection module 208.

The personalization module 210 can determine personalized data for a card. Personalized data can include information that is customized for or specific to a user. As an example, personalized data can include information associated with a user's connections in a social networking system. For instance, information associated with a user's connections can include activities by the user's connections in the social networking system, such as liking a page, following a page, sharing a page, etc. As another example, personalized data can include information that a user is likely to find relevant or interesting. In some embodiments, personalized data for a card can be determined based on machine learning techniques. For example, a machine learning model can be trained to determine personalized data for a card for a user based on a likelihood of the user engaging with the card. The machine learning model can be trained based on training data including information associated with cards that have been provided to users for pages and personalized data included in the cards. The training data can include various features. For example, features can include user attributes, page attributes, content attributes, or any other attributes described above. In addition, features can include personalized data attributes. Personalized data attributes can include any attributes associated with personalized data included in cards. The trained machine learning model can be applied to a card for a user to determine personalized data for the card. In certain embodiments, the same machine learning model(s) can be used by the user intent prediction module 104, the card type ranking module 204, the content selection module 208, and the personalization module 210. All examples herein are provided for illustrative purposes, and there can be many variations and other possibilities.

Figure 3A:
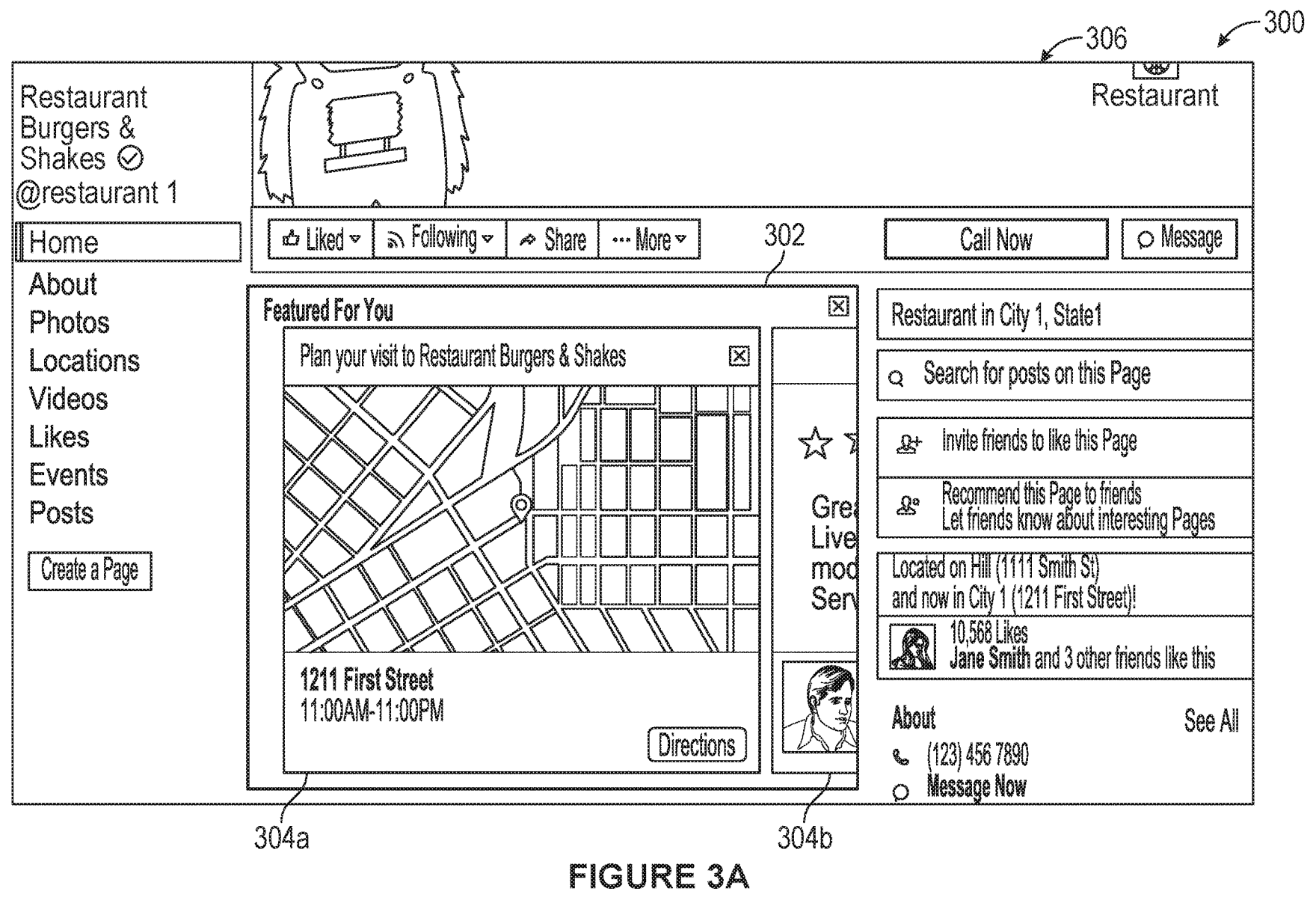

FIG. 3A illustrates an example user interface 300 for providing contextual recommendations for pages, according to an embodiment of the present disclosure. The example user interface 300 shows a page 306 on which a contextual recommendation unit 302 for a user is displayed. In the example of FIG. 3A, the page 306 relates to a restaurant named "Restaurant Burgers & Shakes." The contextual recommendation unit 302 can include one or more cards 304. In FIG. 3A, the contextual recommendation unit 302 includes two cards 304a and 304b. The user can view more cards by scrolling horizontally in the contextual recommendation unit 302. The cards 304 in the contextual recommendation unit 302 can be cards that are created by the contextual recommendation module 102, as discussed herein. For example, the cards 304 are created based on ranked card types for the user, which correspond to intent actions for the user.

Figure 3B:
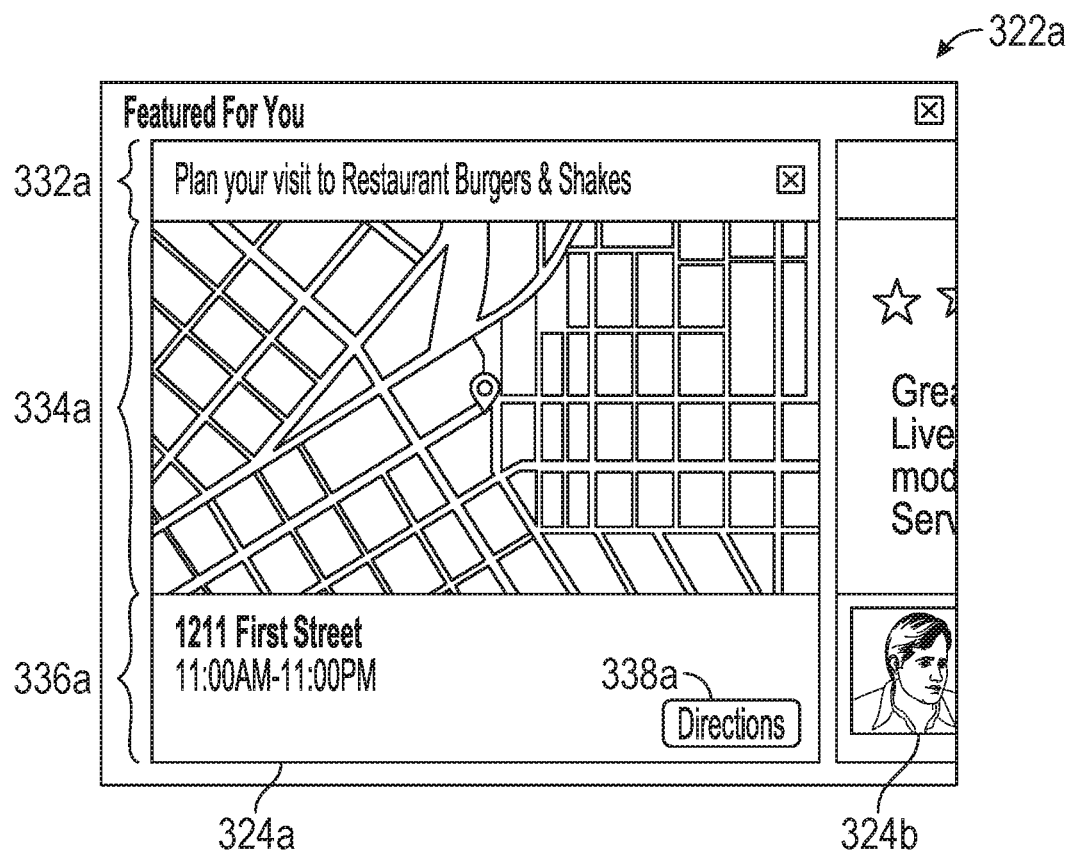
FIG. 3B illustrates an example contextual recommendation unit for providing contextual recommendations for pages, according to an embodiment of the present disclosure.

FIG. 3B illustrates an example contextual recommendation unit 322a for providing contextual recommendations for pages, according to an embodiment of the present disclosure. FIG. 3B shows the contextual recommendation unit 302 in FIG. 3A in more detail. In the example of FIG. 3B, the contextual recommendation unit 322a corresponds to the contextual recommendation unit 302 in FIG. 3A and shows a first card 324a and a portion of a second card 324b. The first card 324a and the second card 324b correspond to the card 304a and the card 304b in FIG. 3A, respectively. Each card 324 can include a header, content, and a footer. For example, the card 324a includes a header 332a, content 334a, and a footer 336a. The card 324a also includes a button 338a for a recommended action. For instance, the button 338a can be provided as a part of the footer 336a. The card 324a is of a map card type. Accordingly, the card 324a can provide a map and/or directions for a location relating to an entity associated with a page. In the example of FIG. 3B, the header 332a shows personalized data "Plan your visit to Restaurant Burgers & Shakes." The message "Plan your visit to Restaurant Burgers & Shakes" can be a personalized message that is selected for the user, for example, from available messages. The content 334a shows a map of Restaurant Burgers & Shakes. The footer 336a shows the street address and hours of Restaurant Burgers & Shakes. The button 338a, upon selection by the user, can provide directions to Restaurant Burgers & Shakes.

Figure 3C:
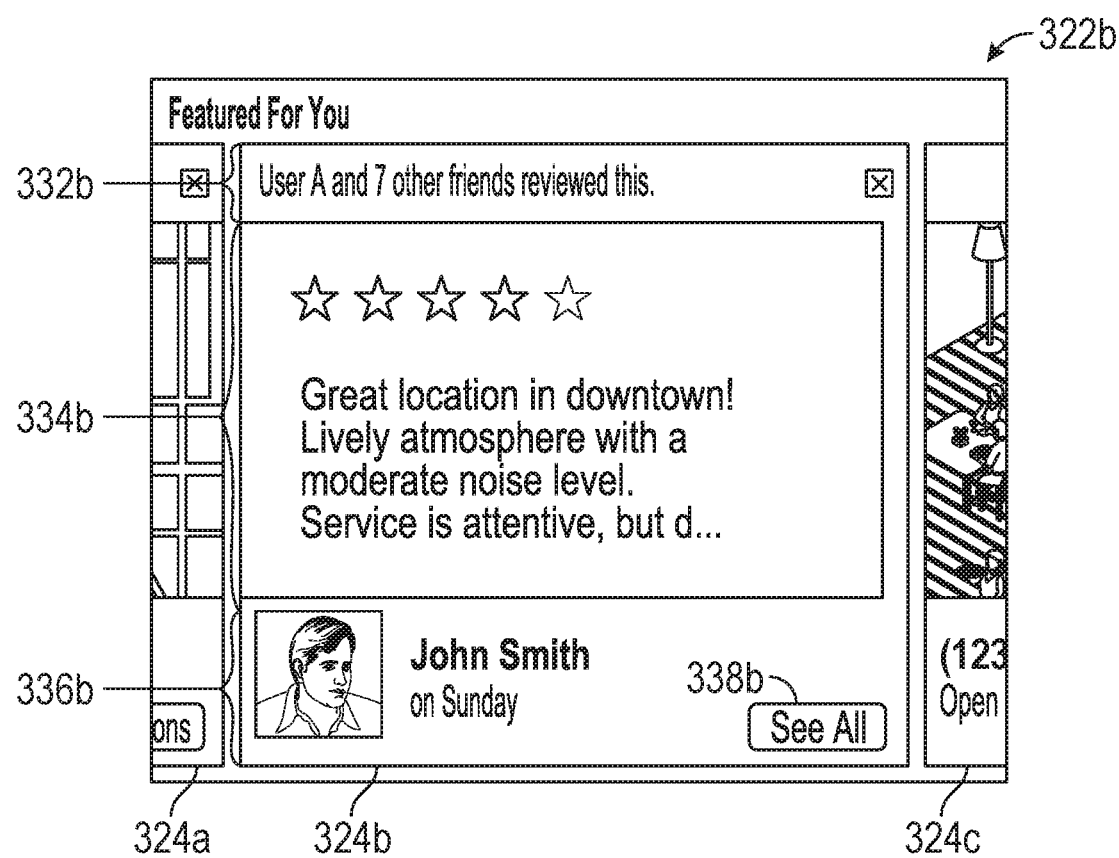
FIG. 3C illustrates an example contextual recommendation unit for providing contextual recommendations for pages, according to an embodiment of the present disclosure.

FIG. 3C illustrates an example contextual recommendation unit 322b for providing contextual recommendations for pages, according to an embodiment of the present disclosure. The contextual recommendation unit 322b corresponds to the contextual recommendation unit 322a in FIG. 3B, which has been scrolled horizontally to show the second card 324b. The card 324b is of a review card type and can provide a portion or a preview of a review of an entity associated with a page. In the example of FIG. 3C, a header 332b shows personalized data "User A and 7 other friends reviewed this." Content 334b shows a portion of a review. A footer 336b shows a user who wrote the review and a time associated with the review. A button 338b, upon selection, can provide more details of the review and/or other reviews associated with the entity.

Figure 3D:
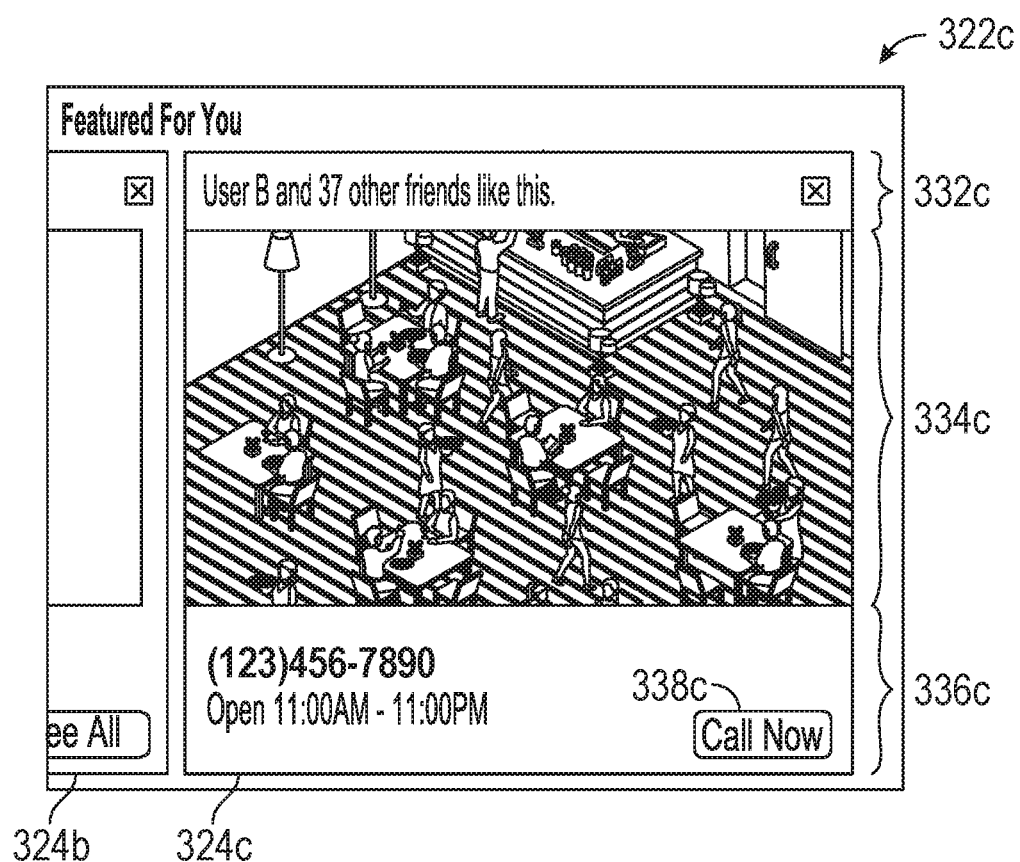
FIG. 3D illustrates an example contextual recommendation unit for providing contextual recommendations for pages, according to an embodiment of the present disclosure.

FIG. 3D illustrates an example contextual recommendation unit 322c for providing contextual recommendations for pages, according to an embodiment of the present disclosure. The contextual recommendation unit 322c corresponds to the contextual recommendation unit 322b in FIG. 3C, which has been scrolled horizontally to show a third card 324c. The card 324c is of a book card type for making a reservation and can provide information for calling an entity associated with a page. In the example of FIG. 3D, a header 332c shows personalized data "User B and 37 other friends like this." Content 334c is an image associated with the entity. A footer 336c shows a phone number and hours associated with the entity. A button 338c, upon selection, can call the entity.

Figure 3E:
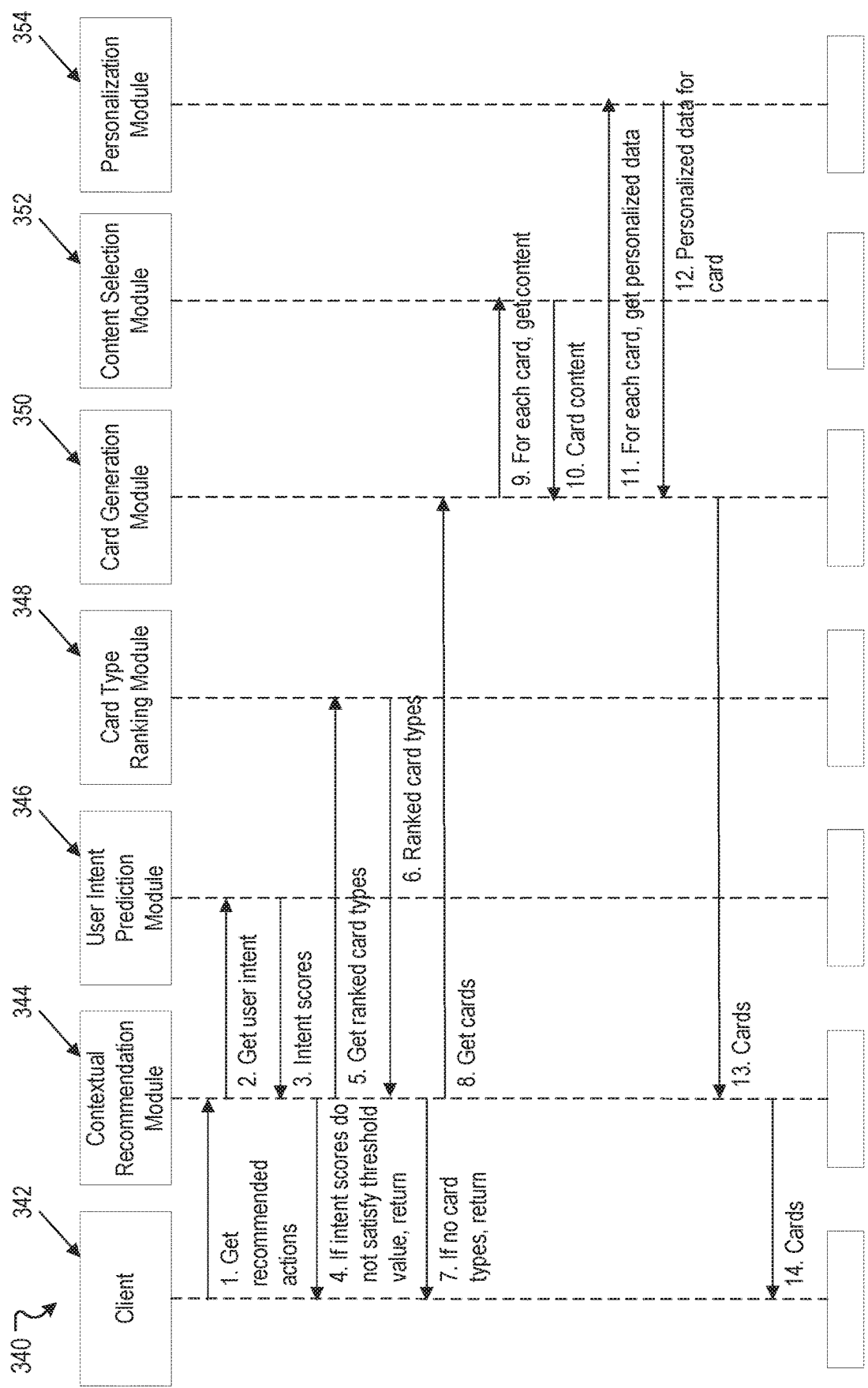
FIG. 3E illustrates an example scenario for providing contextual recommendations for pages, according to an embodiment of the present disclosure.

FIG. 3E illustrates an example scenario 340 for providing contextual recommendations for pages, according to an embodiment of the present disclosure. A client 342 can send a request to get recommended actions from a contextual recommendation module 344. In some embodiments, the contextual recommendation module 344 can be the same as or similar to the contextual recommendation module 102. The contextual recommendation module 344 can send a request to get user intent for a user to a user intent prediction module 346. In some embodiments, the user intent prediction module 346 can be the same as or similar to the user intent prediction module 104. The user intent prediction module 346 can provide intent scores for one or more actions that a user is likely to take. If intent scores for one or more actions do not satisfy a threshold value, the contextual recommendation module 344 may not provide any recommended actions to the client 342. Otherwise, the contextual recommendation module 344 can send a request to get ranked card types to a card type ranking module 348. In some embodiments, the card type ranking module 348 can be the same as or similar to the card type ranking module 204. The card type ranking module 348 can provide ranked card types. If there are no card types, the contextual recommendation module 344 may not provide any recommended actions to the client 342. Otherwise, the contextual recommendation module 344 can send a request to get cards to a card generation module 350. In some embodiments, the card generation module 350 can be the same as or similar to the card generation module 206. The card generation module 350 can generate a card for a ranked card type. The card generation module 350 can send a request to get content for each card to a content selection module 352. In some embodiments, the content selection module 352 can be the same as or similar to the content selection module 208. The content selection module 352 can provide content for a card. The card generation module 350 can send a request to get personalized data for each card to a personalization module 354. In some embodiments, the personalization module 354 can be the same as or similar to the personalization module 210. The personalization module 354 can provide personalized data for a card. The card generation module 350 can provide cards based on content and personalized data for each card provided by the content selection module 352 and the personalization module 354. The contextual recommendation module 344 can provide the cards to the client 342. All examples herein are provided for illustrative purposes, and there can be many variations and other possibilities.

FIG. 4 illustrates an example first method 400 for providing contextual recommendations for pages, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine one or more actions that a user is likely to take on a page associated with a social networking system, based on one or more first machine learning models. At block 404, the example method 400 can rank one or more card types that correspond to the one or more actions, based on a second machine learning model. At block 406, the example method 400 can generate one or more cards based on the ranked card types, each card including a recommended action associated with the page. Other suitable techniques that incorporate various features and embodiments of the present disclosure are possible.

Figure 5:
FIG. 5 illustrates an example second method for providing contextual recommendations for pages, according to an embodiment of the present disclosure.

FIG. 5 illustrates an example second method 500 for providing contextual recommendations for pages, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can train one or more first machine learning models to predict a likelihood of users taking particular actions on pages. The one or more first machine learning models can be similar to the one or more first machine learning models explained in connection with FIG. 4. At block 504, the example method 500 can train a second machine learning model to predict a likelihood of users engaging with cards of particular card types. The second machine learning model can be similar to the second machine learning model explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
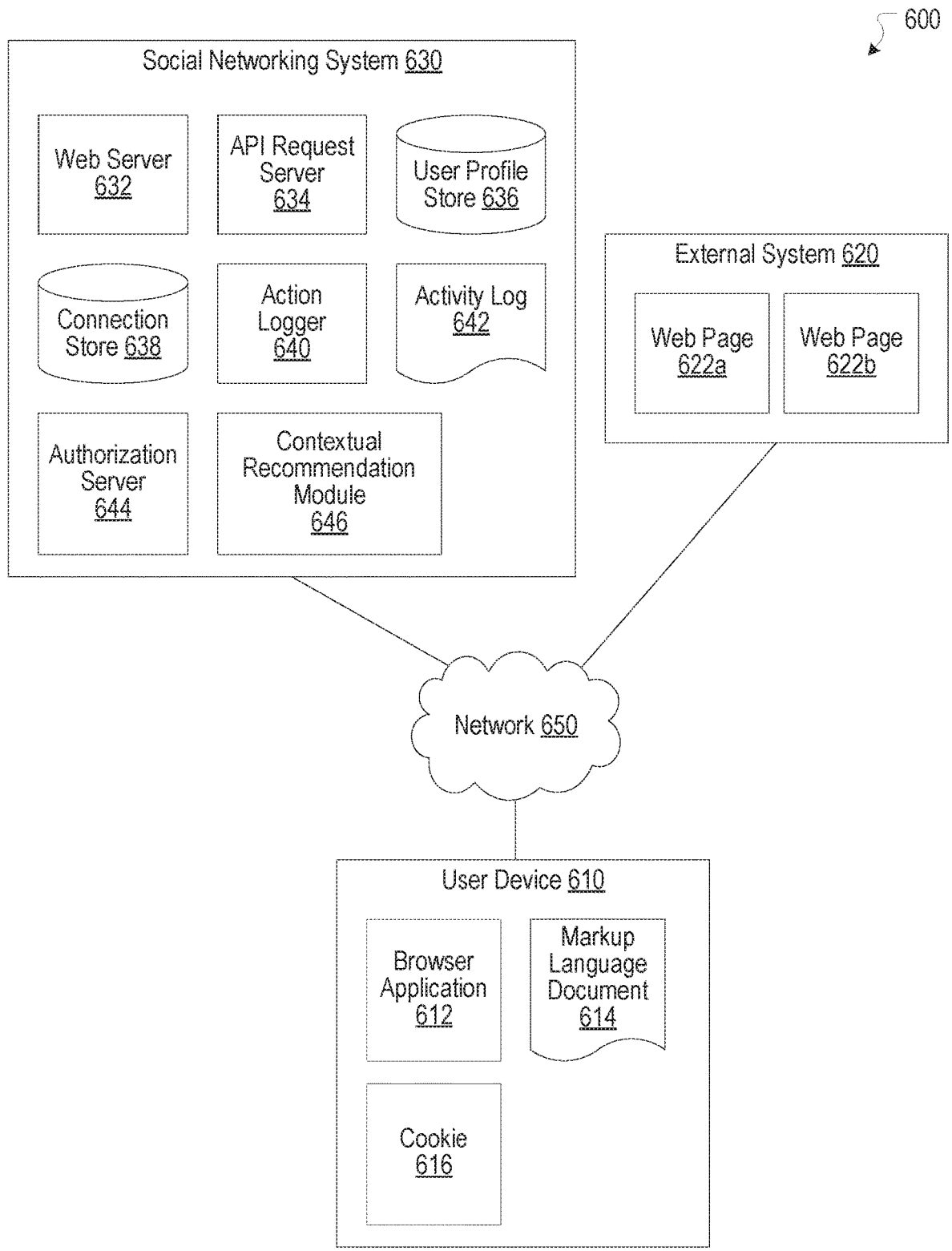
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an contextual recommendation module 646. The contextual recommendation module 646 can be implemented with the contextual recommendation module 102, as discussed in more detail herein. In some embodiments, one or more functionalities of the contextual recommendation module 646 can be implemented in the user device 610.

Hardware Implementation

Figure 7:
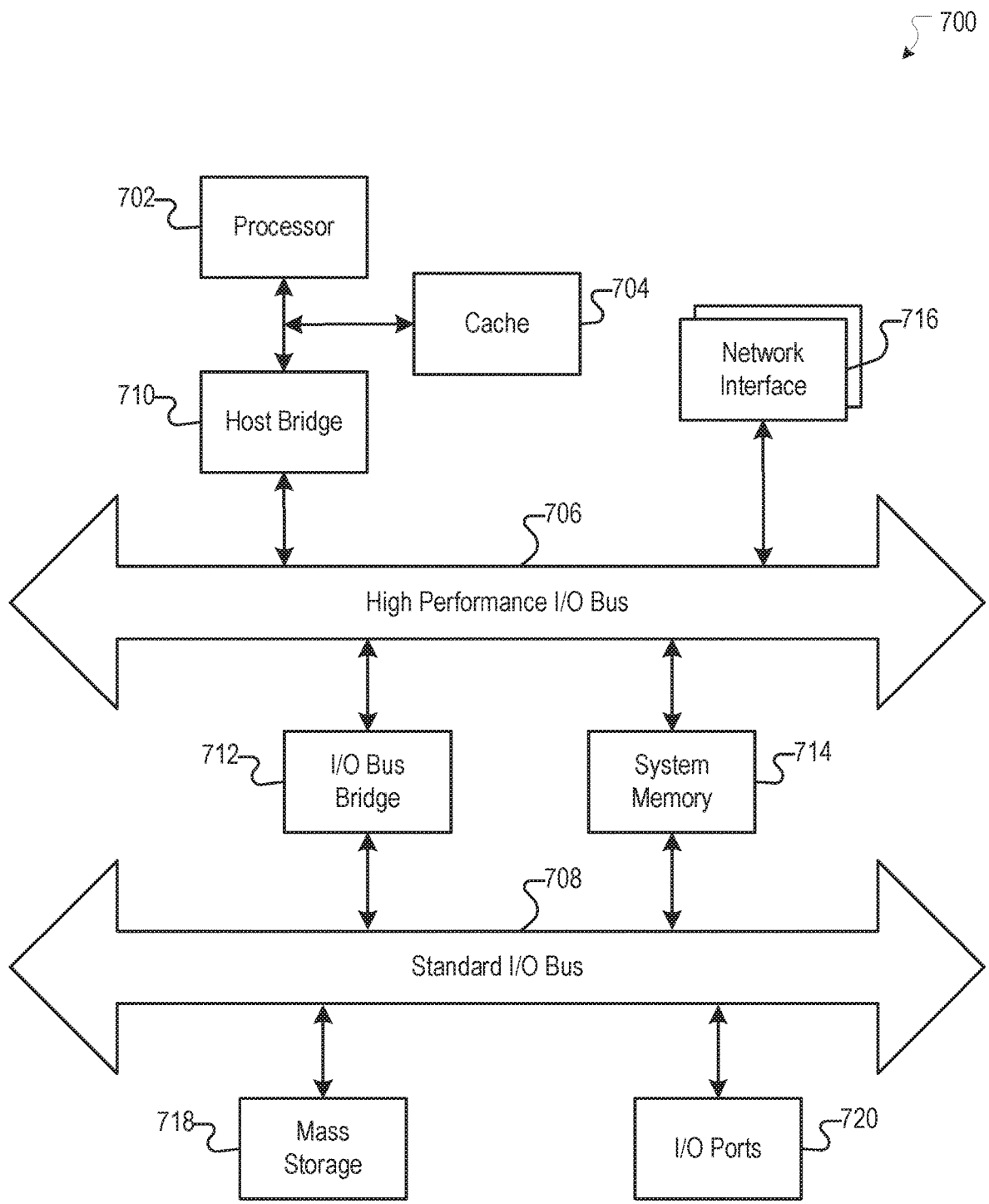
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   predicting, by a computing system, one or more actions that a user may take while accessing a page associated with an entity of a plurality of entities represented on a social networking system based on one or more first machine learning models, wherein the user and the entity are different members of the social networking system and the one or more first machine learning models output scores indicating probabilities of the user taking the one or more actions on the page;
   in response to the predicting, ranking, by the computing system, one or more card types that correspond to the one or more actions based on a second machine learning model, wherein the second machine learning model is trained based at least in part on the scores; and
   generating, by the computing system, on the page one or more cards based on the ranked card types, each card including a recommended action to be taken on the page.

2. The computer-implemented method of claim 1, further comprising:
   providing, by the computing system, the one or more cards for display to the user through the page.

3. The computer-implemented method of claim 1, further comprising:
   providing, by the computing system, the one or more cards for display to the user through a feed of the user.

4. The computer-implemented method of claim 1, wherein the one or more first machine learning models are trained to predict a probability of users taking particular actions on pages.

5. The computer-implemented method of claim 1, wherein the second machine learning model is trained to predict a probability of users engaging with cards of particular card types.

6. The computer-implemented method of claim 1, wherein a card includes a header, content, a footer, personalized data, and a button associated with a recommended action.

7. The computer-implemented method of claim 6, wherein the content includes at least one of an image, a video, text, a link, a map, a preview, a review, or a portion of a review.

8. The computer-implemented method of claim 1, wherein the one or more first machine learning models are trained based on features including one or more of: user attributes, page attributes, attributes associated with interactions between users and pages, or attributes associated with interactions between users and page categories.

9. The computer-implemented method of claim 1, wherein the second machine learning model is trained based on features including one or more of: click through rates for cards, click through rates for card types, user attributes, page attributes, attributes associated with interactions between users and pages, or attributes associated with interactions between users and page categories.

10. The computer-implemented method of claim 1, wherein the one or more actions are indicative of an intent of the user for visiting the page.

11. A system comprising:
   at least one processor; and
   a memory storing instructions that, when executed by the at least one processor, cause the system to perform:
      predicting one or more actions that a user may take on a page associated with an entity of a plurality of entities represented on a social networking system based on one or more first machine learning models, wherein the user and the entity are different members of the social networking system and the one or more first machine learning models output scores indicating probabilities of the user taking the one or more actions on the page;
      in response to the predicting, ranking one or more card types that correspond to the one or more actions based on a second machine learning model, wherein the second machine learning model is trained based at least in part on the scores; and
      generating on the page one or more cards based on the ranked card types, each card including a recommended action to be taken on the page.

12. The system of claim 11, wherein the one or more first machine learning models are trained to predict a probability of users taking particular actions on pages.

13. The system of claim 11, wherein the second machine learning model is trained to predict a probability of users engaging with cards of particular card types.

14. The system of claim 11, wherein a card includes a header, content, a footer, personalized data, and a button associated with a recommended action.

15. The system of claim 11, wherein the one or more actions are indicative of an intent of the user for visiting the page.

16. A non-transitory computer readable medium including instructions that, when executed by at least one processor of a computing system, cause the computing system to perform a method comprising:
   predicting one or more actions that a user may take on a page associated with an entity of a plurality of entities represented on a social networking system based on one or more first machine learning models, wherein the user and the entity are different members of the social networking system and the one or more first machine learning models output scores indicating probabilities of the user taking the one or more actions on the page;
   in response to the predicting, ranking one or more card types that correspond to the one or more actions based on a second machine learning model, wherein the second machine learning model is trained based at least in part on the scores; and
   generating on the page one or more cards based on the ranked card types, each card including a recommended action to be taken on the page.

17. The non-transitory computer readable medium of claim 16, wherein the one or more first machine learning models are trained to predict a probability of users taking particular actions on pages.

18. The non-transitory computer readable medium of claim 16, wherein the second machine learning model is trained to predict a probability of users engaging with cards of particular card types.

19. The non-transitory computer readable medium of claim 16, wherein a card includes a header, content, a footer, personalized data, and a button associated with a recommended action.

20. The non-transitory computer readable medium of claim 16, wherein the one or more actions are indicative of an intent of the user for visiting the page.

* * * * *